Patented Dec. 4, 1934

1,982,675

UNITED STATES PATENT OFFICE 1,982,675

PREPARATION OF ACETOACETANILID

George H. Law, South Charleston, W. Va., assignor to Carbide and Carbon Chemicals Corporation, a corporation of New York No Drawing. Application December 2, 1933, Serial No. 700,729

10 Claims. (Cl. 260—124)

The invention relates to an improved process for preparing acetoacetanilid.

Acetoacetanilid, indicated by the formula $CH_3$—CO—$CH_2$—CO—NH—$C_6H_5$, is a crystalline substance having a melting point of about 84° C. Among various chemical uses to which it is adapted, it serves as an intermediate for the production of a yellow pigment, known as Hansa yellow. The material has heretofore been made by reacting aniline with esters of aceto-acetic acid.

It is an object of my invention to provide a new process for making acetoacetanilid, in a manner more efficient and economically feasible than any heretofore known.

I have found that diketene, commonly designated by the structural formula

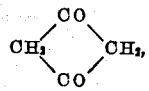

will react with aniline under properly controlled conditions to provide a very good yield of acetoacetanilid. An inert solvent, preferably one in which acetoacetanilid is quite soluble when hot, but from which it can readily be recovered on cooling, is used in conducting the reaction, whereby the main portion of the product can be crystallized out in pure state from the reaction mixture. A small amount of acetanilid is also formed, probably due to the presence of traces of acetic anhydride in the diketene. This may be removed from the acetoacetanilid by selectively treating the residue or the solution with an extractant for acetoacetanilid.

As illustrative of one method of applying this new process the following example is given:

Aniline in an amount of 4300 grams was dissolved in 16,440 grams of toluene and placed in an aluminum kettle equipped with a brine cooled reflux condenser and a dropping funnel. This mixture was agitated with a current of dry natural gas, and 4000 grams of diketene of 93% purity were slowly added through the dropping funnel. While adding the diketene the kettle was cooled in a water bath, and the rate of addition was controlled so as to maintain a temperature of 50° C. to 70° C. in the reaction mixture. On completion of the reaction the hot make was transferred to an aluminum crystallizing vessel and cooled to 20° C. This caused crystallization of a large portion of the acetoacetanilid, which was filtered off. The mother liquor was then cooled to —5° C., and a second group of crystals filtered off. The remaining liquor and the wash were then evaporated to a volume of approximately 3 liters, and cooled to 0° C. to obtain a third group of crystals. This latter material was found to be a mixture of both acetoacetanilid and acetanilid. It was extracted with a 5% solution of aqueous sodium hydroxide, which was filtered and acidified to precipitate acetoacetanilid. This caustic soluble material was then recrystallized with a decolorizing carbon treatment to yield pure acetoacetanilid, and the caustic insoluble material upon like treatment yielded pure acetanilid.

Data obtained from the above example are as follows:

| | |
|---|---|
| Diketene, grams | 4,000 |
| Aniline, grams | 4,300 |
| Toluene, grams | 16,440 |
| Acetoacetanilid, grams | |
| Crop No. 1 | 6,408 |
| Crop No. 2 | 244 |
| Caustic extraction | 132 |
| Total | 6,784 |
| Acetanilid, grams | 72 |
| Diketene efficiency (based on acetoacetanilid) | 86.5% |
| Diketene efficiency (based on acetanilid) | 0.6% |

As shown by the above toluene is the preferred solvent for use in this process, although others may be suitable, such as benzol or acetone. Toluene is, however, less toxic than benzol, and it forms a solution containing 80% of acetoacetanilid at 80° C, while at 20° C. the saturated solution contains only about 3% of acetoacetanilid. Acetone has a more marked solvent power for the product, and if diluted with water tends to precipitate the acetoacetanilid as an oil.

The first crystallization step removes the greater portion of the acetoacetanilid from the reaction solution, and as a modification of the above procedure, caustic extraction of the solution may be performed after the first crop of crystals is filtered off. This would avoid the progressive concentration of the mother liquor, and may be desirable as a means of accelerating the process. Aluminum equipment is preferably used up to the point of caustic extraction, since iron rapidly polymerizes diketene and also imparts a color to acetoacetanilid. This product is also colored by contact with copper or copper alloys, and recrystallization is necessary to remove traces of dissolved copper, if the caustic extraction is performed in contact with this metal.

Various modifications in the actual example given will be evident to those skilled in the art, and the invention should not be limited except as in the appended claims.

I claim:—

1. Process for making acetoacetanilid which comprises treating aniline with diketene, and recovering acetoacetanilid from the reaction liquor.

2. Process for making acetoacetanilid which comprises treating aniline with diketene in the presence of a solvent from which acetoacetanilid will crystallize out on cooling.

3. Process for making acetoacetanilid which comprises treating aniline with diketene in the presence of a medium solvent to both aniline and acetoacetanilid while hot, and crystallizing out acetoacetanilid by cooling the reaction mixture.

4. Process for making acetoacetanilid which comprises dissolving aniline in a solvent which will also dissolve acetoacetanilid while hot, adding diketene slowly to the solution, and crystallizing out acetoacetanilid from the reaction mixture by cooling.

5. Process for making acetoacetanilid which comprises dissolving aniline in a solvent which will also dissolve acetoacetanilid while hot, adding diketene slowly to the solution, crystallizing out a major portion of the acetoacetanilid from the reaction mixture by cooling, and subsequently removing the remainder of the acetoacetanilid by extraction with a caustic solution.

6. Process for making acetoacetanilid which comprises treating aniline with diketene in the presence of a toluene solvent, and crystallizing out acetoacetanilid from the reaction mixture by cooling.

7. A process for making acetoacetanilid which comprises treating aniline with diketene in the presence of a toluene solvent, crystallizing out a major portion of the acetoacetanilid by progressive cooling of the reaction mixture, and subsequently removing the remainder of the acetoacetanilid by extraction with an aqueous caustic solution.

8. Process for making acetoacetanilid which comprises dissolving aniline in toluene, slowly adding diketene to the solution while maintaining the reaction mixture to a temperature of about 50° C. to 70° C., and cooling the reaction mixture to a temperature sufficient to crystallize out pure acetoacetanilid.

9. Process for making acetoacetanilid which comprises dissolving aniline in toluene, slowly adding diketene to the solution while maintaining the reaction mixture to a temperature of about 50° C. to 70° C., cooling the reaction mixture to a temperature sufficient to crystallize out a major portion of the acetoacetanilid, and subsequently removing the remainder of the acetoacetanilid by extraction with an aqueous caustic solution.

10. Process for making acetoacetanilid which comprises dissolving aniline in toluene, slowly adding diketene to the solution while maintaining the reaction mixture to a temperature of about 50° C. to 70° C., progressively cooling the reaction mixture to a temperature of about −5° C., whereby a major portion of the acetoacetanilid is removed by crystallization, concentrating and cooling the remaining liquor to remove further crystalline material, and extracting the latter material with a dilute aqueous sodium hydroxide solution to remove the remainder of the acetoacetanilid.

GEORGE H. LAW.